United States Patent
Keese et al.

(10) Patent No.: US 7,265,544 B2
(45) Date of Patent: Sep. 4, 2007

(54) METHOD AND DEVICE FOR DETECTING PHYSICAL-CHEMICAL STATES ON MEASURING ELECTRODES OF A FLOWMETER

(75) Inventors: Dieter Keese, Wahlsburg (DE); Thomas-Fritz Blume, Halle (DE); Dirk Steckel, Adelebsen (DE)

(73) Assignee: ABB patent GmbH, Ladenburg (DE)

( * ) Notice: Subject to any disclaimer, the term of this patent is extended or adjusted under 35 U.S.C. 154(b) by 0 days.

(21) Appl. No.: 11/486,599

(22) Filed: Jul. 14, 2006

(65) Prior Publication Data

US 2007/0035309 A1 Feb. 15, 2007

(30) Foreign Application Priority Data

Jul. 16, 2005 (DE) .................. 10 2005 033 290

(51) Int. Cl.
*G01V 3/00* (2006.01)
*G01F 1/58* (2006.01)
*G01F 1/00* (2006.01)

(52) U.S. Cl. ............... 324/306; 73/861.12; 702/45

(58) Field of Classification Search ............ 324/612, 324/600, 76.11, 71.1, 92, 522, 306; 73/861, 73/861.08, 861.11, 861.12, 861.17, 152.18; 702/45
See application file for complete search history.

(56) References Cited

U.S. PATENT DOCUMENTS

| 4,157,035 A | * | 6/1979 | Doll et al. ............... 73/861.17 |
|---|---|---|---|
| 4,648,279 A | * | 3/1987 | Milsch et al. ............ 73/861.17 |
| 4,704,908 A | * | 11/1987 | Blatter .................... 73/861.17 |
| 4,972,722 A | * | 11/1990 | Hansen et al. ........... 73/861.17 |
| 5,905,206 A | * | 5/1999 | Herwig et al. ........... 73/861.12 |
| 6,453,755 B1 | * | 9/2002 | Brockhaus ............... 73/861.11 |
| 6,708,569 B2 | * | 3/2004 | Budmiger ................ 73/861.12 |
| 7,114,400 B2 | * | 10/2006 | Florin ..................... 73/861.12 |
| 2006/0080049 A1 | * | 4/2006 | Budmiger et al. ........... 702/45 |

* cited by examiner

*Primary Examiner*—Walter Benson
*Assistant Examiner*—Hoai-An D. Nguyen
(74) *Attorney, Agent, or Firm*—Michael M. Rickin

(57) ABSTRACT

A method and device for obtaining an interference free measurement from a flowmeter. The flowmeter includes a measuring tube through which a flowable medium flows through a magnetic field generated by a magnetic arrangement and at least two measuring electrodes for detecting the measurement voltage induced by the flowable medium. The medium gives rise to interference voltages. The electrodes are connected to an interference-voltage eliminating unit by which common-mode interference is first eliminated by differentiation and unequal interference voltages are subsequently eliminated. In operation, the current voltage value $U+(n)$ and $U-(n)$ of each individual measuring electrode is compared with the associated preceding voltage value $U+(n-1)$ and $U-(n-1)$, and the interference-voltage eliminating unit outputs a measurement for further signal processing only when an equal, essentially proportional change in the voltage values $U+(n)$ to $U+(n-1)$ and $U-(n)$ to $U-(n-1)$ is found at each measuring electrode, which is evaluated as interference-free measurement.

9 Claims, 1 Drawing Sheet

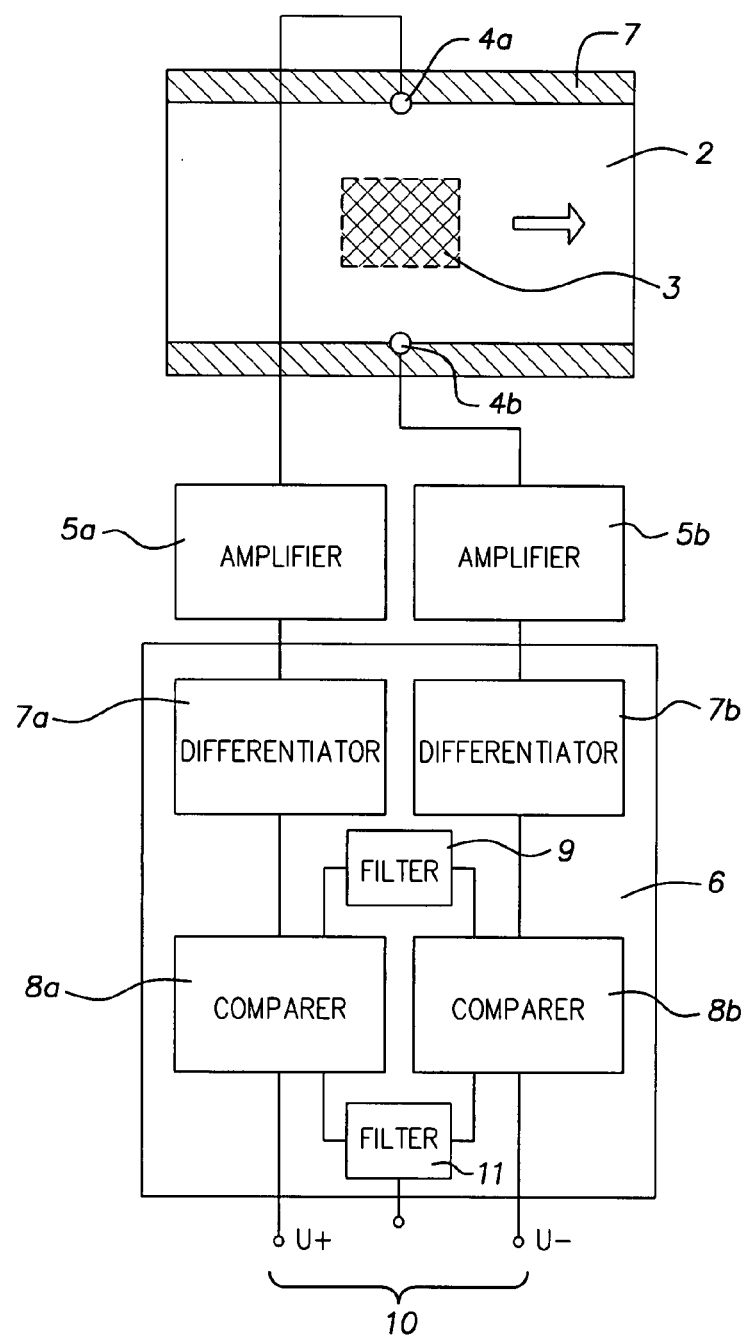

METHOD AND DEVICE FOR DETECTING PHYSICAL-CHEMICAL STATES ON MEASURING ELECTRODES OF A FLOWMETER

This application claims priority from German Application DE 10 2005 033 290.0 filed on Jul. 16, 2005 the contents of which are relied upon and incorporated herein by reference in their entirety, and the benefit of priority under 35 U.S.C. 119 is hereby claimed.

The invention relates to a method and to a device according to the preamble of claims 1 and 6, respectively.

The field of use of such a magnetic-inductive flowmeter extends to the determination of volume or mass flows of a flowable medium such as fluids, pulps, pastes or the like. The flowable medium must have a certain minimum electrical conductivity for the measuring method to function. Flowmeters of the type which are of interest here are characterized by very accurate measuring results, no pressure loss being caused by the measurement in the pipeline system. In addition, magnetic-inductive flowmeters do not have any moving components or components which protrude into the measuring tube which, as a result, would be particularly subject to wear. The flowmeters of interest here are predominantly used in the chemical industry, in pharmaceutics and in the cosmetics industry and also in communal water and waste water production and in the food industry.

The measuring method is based on Faraday's law of induction. This law of nature says that a voltage is induced in a conductor moving in a magnetic field. When this law of nature is utilized for measuring, the electrically conductive medium flows through a measuring tube in which a magnetic field is generated perpendicularly to the direction of flow. The voltage induced as a result in the medium is picked up by an electrode arrangement.

The electrode arrangement used is in most cases two measuring electrodes used opposite one another in the measuring tube. Since the measurement voltage obtained in this manner is proportional to the mean flow velocity of the flowing medium, the volume flow of the medium can be determined from this. Taking into consideration the density of the flowing medium, its mass flow can also be determined.

EP 0 869 336 A2 discloses a generic magnetic-inductive flow measuring device with a measuring tube which has on both sides connecting flanges for detachable assembly in a pipeline system. An electrode arrangement interacts with two opposite electrical magnetic coils which generate the required magnetic field perpendicularly to the direction of flow in the measuring tube. Within this magnetic field, each volume element of the flowing medium moving through the magnetic field supplies a contribution to the measurement voltage picked up via the measuring electrodes with the field strength present in this volume element. The measurement voltage is supplied to the input of following evaluation electronics. Within the evaluation electronics, the signal is first amplified via an electronic differential amplifier, the differential amplifier in this case operating with respect to the reference potential which usually corresponds to ground potential. On the basis of the measurement voltage, the evaluation electronics supply a value for the volume current of the medium flowing through the measuring tube.

In principle, the medium flowing through the measuring tube and having a minimum conductivity can act electrolytically since the medium contains either metal and non-metal ions in the case of a saline solution or $H^+$ or $OH^-$ ions in the case of acid/alkaline substances. This causes an electrical voltage between the metallic measuring electrodes and the medium even when no magnetic field is present. If exactly the same conditions exist at both measuring electrodes, this interference voltage is eliminated by the normally used differential amplifiers of the evaluation electronics. In practice, however, this is often not the case due to inhomogeneous characteristics of the medium, electrode surfaces soiled to different extents and different flow, temperature and pressure distribution of the medium in the measuring tube. As a result, its interference voltages occur which are in most cases much higher than the useful voltages and are additively superimposed with an unknown change in the direct-voltage component which leads to interference with the measurement.

To reduce such influences of interference voltages which cannot be eliminated by differentiation, it is generally known to use digital filter means—such as temporal attenuation of the measurement evaluation, statistical averaging and the like. In most cases, however, these measures do not lead to a satisfactory result.

It is the object of the present invention, therefore, to create a method and a device for detecting physical-chemical states on measuring electrodes by which means an efficient elimination of unequal interference voltages can be implemented in a simple manner.

The object is achieved by claim 1 with regard to the method. The object is achieved by claim 6 with regard to a corresponding device. The dependent claims referred back in each case provide advantageous developments of the invention.

The invention includes the method teaching that, after common-mode interference has been eliminated, unequal interference voltages are also eliminated by differentiation by an interference-voltage eliminating unit, in that, in operation, the current voltage value $U+(n)$ and $U-(n)$ of each individual measuring electrode is compared with the associated preceding voltage value $U+(n-1)$ and $U-(n-1)$, a measurement being released for further signal processing only when as a result of the comparison, an equal, essentially proportional change in the voltage values $U+(n)$ to $U+(n-1)$ and $U-(n)$ to $U-(n-1)$ is found at each measuring electrode which is evaluated as interference-free measurement.

In particular, the advantage of the solution according to the invention lies in the fact that it can be realized in a simple manner as a device. Essentially, this only requires an electronic comparer unit which is adequately well known in the art of signal processing of the type of interest here. The comparer unit must be connected to a storage unit for storing the preceding voltage value which is kept available for the comparer unit with regard to the comparison operations to be performed. Comparer unit and storage unit are an integral component of the interference-voltage eliminating unit. A prerequisite for the efficient elimination of interference voltage is the fact that the measurement voltage is evaluated individually at each measuring electrode by the method according to the invention. Since common-mode interference no longer needs to be considered due to the conventional differentiation which has taken place previously, the much more risky unequal interference voltages of the respective measuring electrode can be detected and suppressed by means of the solution according to the invention. The measuring method according to the invention can be used for optimum interference voltage detection and suppression and, at the same time, for diagnosing errors of the measuring point. A further advantage is the fact that this method has the characteristic of emergency operation in the case of a defective measuring electrode or disturbed measuring signal since it is possible to continue to measure with restricted measuring accuracy in these cases without the flowmeter failing completely.

This is because, according to a measure improving the invention, it is provided that when a non-interference-free measurement is detected, the preceding voltage values U+(n−1) and U−(n−1), identified as interference-free, are used for further signal processing instead of the current voltage values U+(n) and U−(n).

If a non-interference-free measurement of the current voltage values U+(n) and U−(n) is detected, these should be advantageously analyzed by a filter unit in order to determine what triggered the interference. It is thus possible to detect a disturbed measurement voltage at a measuring electrode in order to eliminate the cause of the interference—for example turbulent flow characteristic or local heating in the flowable medium.

It is also proposed that an amplifier unit is connected before the interference-voltage eliminating unit, to amplify the voltage values U+ and U− picked up directly from the measuring electrodes. Using this measure, the effectiveness of the subsequent interference voltage elimination can be considerably increased since signal differences appear more distinctly due to a higher amplitude.

Further measures improving the invention will be represented in greater detail in the text which follows, together with the description of a preferred exemplary embodiment of the invention and referring to the single figure.

The FIGURE shows a diagrammatic representation of a flowmeter with a device for detecting physical-chemical states on measuring electrodes.

According to the figure, the magnetic-inductive flowmeter essentially consists of a measuring tube 1 through which a flowable medium 2 having a minimum electrical conductivity flows in the flow direction shown and the volume current of which must be measured. For this purpose, a magnetic arrangement 3 (shown only partially here) is arranged externally on the measuring tube 1, which is used for generating a magnetic field through which the flowable medium 2 passes when flowing through the measuring tube 1. To detect the measurement voltage induced by the flowable medium 2, two measuring electrodes 4a and 4b are provided which are diametrically arranged at the measuring tube 1. The measuring electrodes 4a and 4b are constructed in the manner of galvanic electrodes.

The measurement voltages U+ and U− detected by the two measuring electrodes 4a and 4b are initially supplied in each case to an associated amplifier unit 5a and 5b for amplifying the voltage values U+ and U− picked up. After that, the amplified voltage values U+ and U− are supplied to the input of an interference-voltage eliminating unit 6. Within the interference-voltage eliminating unit 6, the measurement voltages U+ and U− pass through an in each case associated differentiating unit 7a and 7b which initially remove common-mode interference in a manner known per se from the voltage values U+ and U−.

After that, the voltage values U+ and U− may still contain unequal interference voltages which falsify the measurement result and are thus also eliminated by utilizing the subsequent comparer units 8a and 8b. Within the comparer units 8a and 8b, the voltage values U+(n) and U−(n) of each individual measuring electrode 4a and 4b, currently measured, are compared with the associated preceding voltage value U+(n−1) and U−(n−1). The preceding error-free voltage values U+(n−1) and U−(n−1) are stored in the in each case associated storage unit 9a, 9b. When the comparison within the comparer unit 8a and 7b of each measuring electrode 4a and 4b produces an identical, essentially proportional change in the voltage values U+(n) in comparison with the preceding value U+(n−1) and U−(n−1) respectively, an interference-free measurement exists and the voltage value U+(n) and U−(n) currently measured is output for further signal processing at the output 10 of the interference-voltage eliminating unit 6.

If, in contrast, the comparison within the comparer units 8a and 8b produces a non-interference-free measurement because of unproportional changes, the preceding voltage values U+(n−1) and U−(n−1) identified as interference-free are used for further signal processing instead of the current voltage values U+(n) and U−(n) with interference. These interference-free voltage values U+(n−1) and U−(n−1) are stored for this purpose in the storage units 9a and 9b. This measure ensures a type of emergency operation characteristic of the device according to the invention.

In addition, the comparer unit 8a and 8b is connected to a filter unit 9. The filter unit 9 is used for analyzing the current voltage values U+(n) and U−(n) which have been identified as non-interference-free by the comparer units 8a and 8b, in order to determine what triggered the interference—for example electrode soiling. Thus, maintenance measures can be undertaken selectively.

The invention is not restricted to the preferred exemplary embodiment described above. Deviations therefrom are also conceivable which are covered by the range of protection of the subsequent claims. Thus, the invention is not restricted to the use of exactly two measuring electrodes for detecting the induced measurement voltage, for example. If other measuring electrodes are used, the interference-voltage eliminating unit according to the invention must be extended by means of correspondingly parallel signal processing lines.

The invention claimed is:

1. A method for obtaining an interference-free-measurement from a flowmeter, comprising:
   providing a flowmeter including a measuring tube through which a flowable medium flows;
   arranging externally on the measuring tube a magnetic arrangement for generating a magnetic field through which the flowable medium passes when flowing through the measuring tube;
   arranging diametrically at the measuring tube at least two measuring electrodes for detecting the measurement voltage induced by the flowable medium;
   connecting the at least two measuring electrodes to an interference-voltage eliminating unit;
   configuring the interference-voltage eliminating unit for eliminating common-mode interference by differentiation;
   configuring the interference-voltage eliminating unit for eliminating unequal interference voltages by providing comparing means for comparing the current voltage values U+(n) and U−(n) of each individual measuring electrode with the associated preceding voltage value U+(n−1) and U−(n−1); and
   outputting a measurement for further signal processing only when the comparison produces an equal, essentially proportional change in the voltage values U+(n) to U+(n−1) and U−(n) to U−(n−1) at each measuring electrode (4a: 4b), which corresponds to an interference-free measurement.

2. The method as claimed in claim 1, wherein, when a non-interference-free measurement is detected, the preceding voltage values U+(n−1) and U−(n−1), identified as interference-free, are used for further signal processing instead of the current voltage values U+(n) and U−(n).

3. The method as claimed in claim 1, wherein, when a non-interference-free measurement of the current voltage values U+(n) and U−(n) is detected, these are analyzed by a filter unit in order to determine what triggered the interference.

4. The method as claimed in claim 1, wherein the voltage values U+ and U− picked up from the measuring electrodes, before the elimination of the common-mode interference, are amplified by an in each case associated amplifier unit in order to increase the effectiveness of the subsequent interference voltage elimination.

5. The method as claimed in claim 1, wherein, for the purpose of calibrating the flowmeter, the measuring ranges of possible voltage values U+ and U− are determined and stored in the interference-voltage eliminating unit after common-mode interference has been eliminated.

6. A device for obtaining an interference-free-measurement from a flowmeter, comprising:
    a flowmeter including a measuring tube through which a flowable medium flows;
    a magnetic arrangement arranged externally on the measuring tube and used for generating a magnetic field through which the flowable medium passes when flowing through the measuring tube;
    at least two measuring electrodes diametrically arranged at the measuring tube and used for detecting the measurement voltage induced by the flowable medium; and
    an interference-voltage eliminating unit connected to the at least two measuring electrodes and used for eliminating common-mode interference by differentiation;
    wherein the interference-voltage eliminating unit also eliminates unequal interference voltages by providing comparing means for comparing the current voltage values U+(n) and U−(n) of each individual measuring electrode with the associated preceding voltage value U+(n−1) and U−(n−1); and
    the interference-voltage eliminating unit outputs a measurement for further signal processing only when the comparison produces an equal, essentially proportional change in the voltage values U+(n) to U+(n−1) and U−(n) to U−(n−1) at each measuring electrode, which corresponds to an interference-free measurement.

7. The device as claimed in claim 6, wherein, in the case of a non-interference-free measurement of the current voltage values U+(n) and U−(n), these are supplied to a filter unit for analyzing what triggered the interference.

8. The device as claimed in claim 6, wherein an amplifier unit for amplifying the voltage values U+ and U− picked up from the measuring electrodes is connected before the interference-voltage eliminating unit in order to increase the effectiveness of the subsequent interference voltage elimination.

9. The method as claimed in claim 2, wherein, when a non-interference-free measurement of the current voltage values U+(n) and U−(n) is detected, these are analyzed by a filter unit in order to determine what triggered the interference.

* * * * *